United States Patent

Suhir

[11] Patent Number: 6,016,377
[45] Date of Patent: Jan. 18, 2000

[54] METHOD FOR DETERMINING AND OPTIMIZING THE CURVATURE OF A GLASS FIBER FOR REDUCING FIBER STRESS

[75] Inventor: Ephraim Suhir, Randolph, N.J.

[73] Assignee: Lucent Technologies Inc., Murray Hill, N.J.

[21] Appl. No.: 08/994,121

[22] Filed: Dec. 19, 1997

[51] Int. Cl.[7] .................................................... G02B 6/00
[52] U.S. Cl. ........................ 385/135; 385/137; 385/147
[58] Field of Search ................................... 385/134–137, 385/147

[56] References Cited

U.S. PATENT DOCUMENTS

| | | | |
|---|---|---|---|
| 5,310,510 | 5/1994 | Pascher | 385/105 X |
| 5,492,281 | 2/1996 | Blaszyk et al. | 385/128 X |

OTHER PUBLICATIONS

Cowap, S.F. and S. D. Brown, 1984. "Static Fatigue Testing of a Hermetically Sealed Optical Fiber," *Am. Ceram. Soc. Bull.*, vol. 63, No. 3, No Month Avail.

Sinclair, D., 1950. "A Bending Method for Measurement of the Tesnile Strength and Young's Modulus of Glass Fiber," *J. Appl. Phys.*, vol. 21, May.

Suhir, E., 1992 "The Effect of Nonlinear Behaviour of the Material on Two–Point Bending in Optical Glass Fibers," *ASME J. Electr. Pack.*, vol. 114, No. 2, Jun.

*Primary Examiner*—John D. Lee
*Assistant Examiner*—Michael J. Stahl

[57] ABSTRACT

A method for reducing the stress in a fiber by varying the curvature of a fiber disposed on a cylindrical surface, so that the first end of the fiber is clamped to the cylindrical surface and the second end of the fiber is moveably fastened to the cylindrical surface. The method extends the fiber around a portion of the cylinder, provides a fastening element so as to control the location of the second end of the fiber on the cylindrical surface and adjusts the curvature of the fiber so that the total curvature of the fiber remains substantially constant over the entire length of the fiber.

10 Claims, 4 Drawing Sheets

METHOD FOR DETERMINING AND OPTIMIZING THE CURVATURE OF A GLASS FIBER FOR REDUCING FIBER STRESS

FIELD OF THE INVENTION

This invention relates to a method for the evaluation of the bending deformation of an optical fiber, and specifically to a method for determining and optimizing the curvature of the fiber that results in the reduction of the bending stress in the fiber.

BACKGROUND OF THE INVENTION

Glass fibers are employed by many photonic designs. In many occasions the glass fiber is configured in a complex three-dimensional arrangement. Unlike copper wires, glass fibers are susceptible to static fatigue (delayed fracture) that eventually leads to fiber breakage. As far as the fiber desirability is concerned, the ability to predict and possibly minimize the fiber curvature for lower induced stresses is of obvious practical importance.

One application that requires fiber bending is the "pigtail" arrangement in a gain equalization filter (GEF) splice box design. Typically, in this arrangement, one end of the fiber is clamped. The fiber axis at this clamped end is parallel to the generating line of the splice box cylinder. The fiber is wrapped around this cylinder, so that its other end touches the inner surface of a flange fastened on the cylinder. The free end of the fiber is oriented along the cylinder circumference. Thus, there is a need to reduce the stress on a bent fiber so as to extend its life expectancy.

SUMMARY OF THE INVENTION

In accordance with one embodiment of the invention, a method for optimizing the curvature of a fiber comprises the steps of fastening one end of the fiber at a predetermined portion of a cylinder; wrapping the fiber around the cylinder; providing a fastening element so as to control the location of the second end of the fiber on the cylinder; and adjusting the position of the fastening element in such a way that $$s' = d - R \arctan\left[\tan\left(\frac{d}{R}\right)\sqrt{1 - \frac{\sin^2\left(\frac{z}{R}\right)}{\sin^2\left(\frac{d}{R}\right)}}\right]$$

wherein s' is the curvilinear coordinate of the fiber, d is the distance measured along a straight line from the first end to the second end, R is the radius of the cylinder, and z is the longitudinal coordinate (parallel with the axis of the cylinder).

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

DETAILED DESCRIPTION OF THE DRAWINGS

Figure 1:
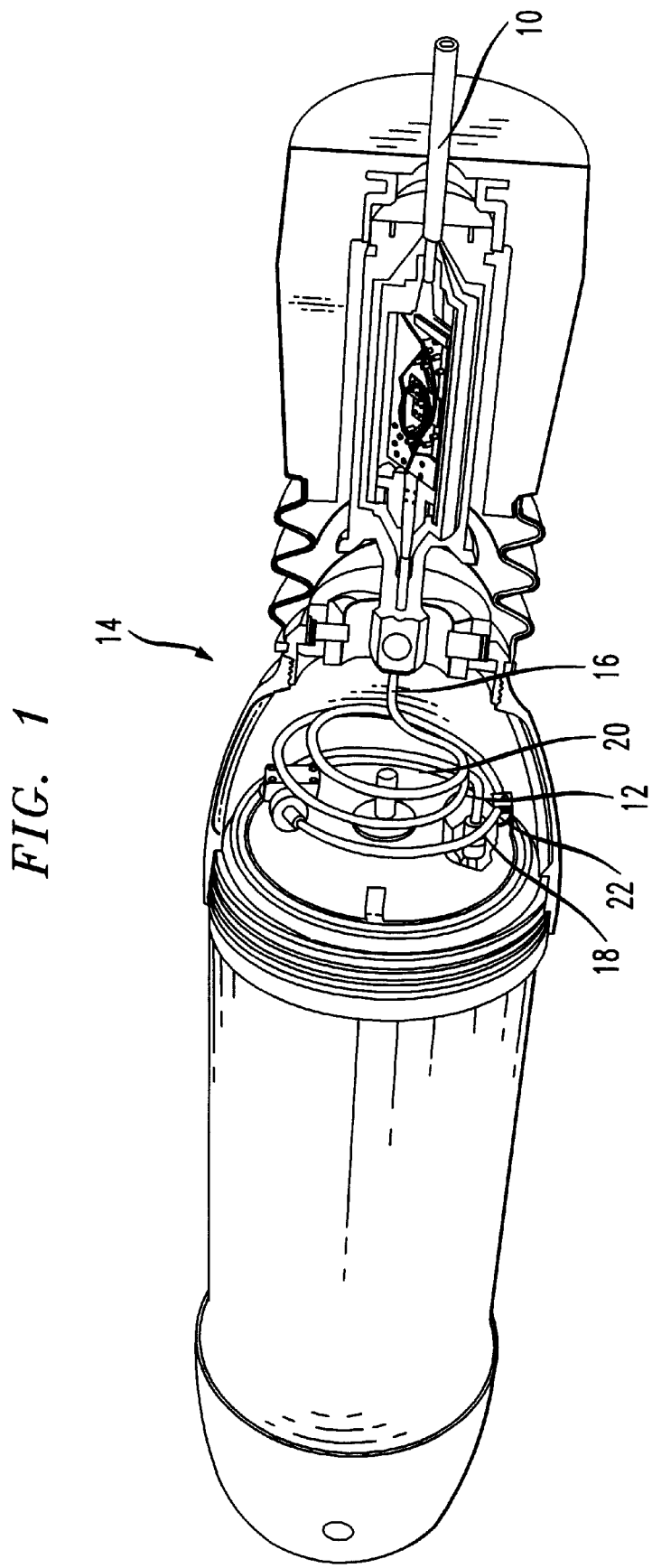
FIG. 1 illustrates a fiber "pigtail" arrangement in a gain equalization filter in accordance with one embodiment of the invention.

FIG. 1 illustrates a gain equalization filter (GEF) 14 that employs an optical fiber that is wrapped around a splice box cylinder 20, although the invention is not limited to this application and other arrangements that require fiber bending may employ the principles discussed herein. The fiber wrap arrangement around cylinder 20 is referred to as fiber pigtail 12. Pigtail 12 exits gain equalization filter 14 with its axis 10 parallel to the generating line of splice box cylinder 20. The first end 16 of fiber 12 is rigidly clamped. The fiber is wrapped around the cylinder, so that its second end 18 touches the inner surface of a flange 22 fastened on cylinder 20. End 18 of the fiber is oriented along the cylinder circumference and for a "natural" fiber configuration, is considered "free." In such a case, end 18 of fiber 12 is subjected to a reaction force, T only, because no bending movements arise at this point.

Figure 2:
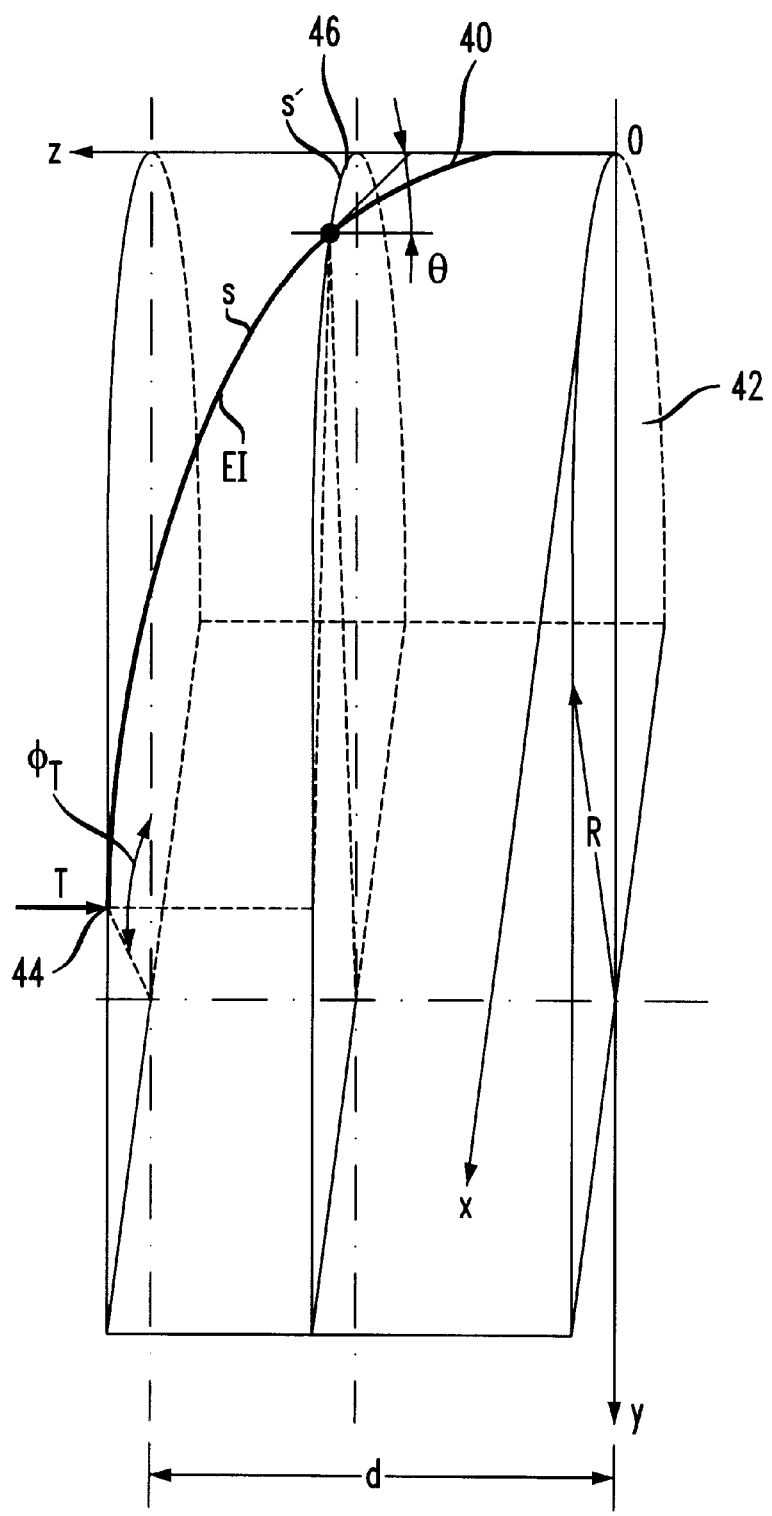
FIG. 2 illustrates the geometrical arrangement of a fiber wrapped around a cylindrical surface.

In accordance with one embodiment of the invention, it is desired to modify the configuration of the fiber so as to reduce the bending stress exerted on the fiber. FIG. 2 illustrates bent fiber 40, which is wrapped around a cylinder 42 of radius R. The geometry of the bent fiber in the cylindrical surface is illustrated within a three dimensional x,y,z coordinate, wherein the z axis is oriented along the axis of cylinder 42, the x axis is oriented along a line normal to the plane of paper and the y axis is orthogonal to the z axis. Fiber 40 is clamped at the origin of the three dimensional coordinate system, and is located on the surface of the cylinder. The fiber configuration is determined by the curvilinear coordinate s. The free end 44 of fiber 40 is restrained by a flange at a distance z=d, wherein d is the "span" of the fiber defined as the longitudinal distance from the clamped end to the free end 44 of the fiber.

The stress in any point of the fiber is proportional, among other things, to the fiber curvature at that point. The three-dimensional fiber curvature is due to fiber bending in the tangential plane, as well as to its bending in the normal plane (FIG. 2). The total curvature of the fiber can be found as $$\kappa = \sqrt{\left[\frac{d\theta}{ds}\right]^2 + \frac{\sin^2\theta}{R^2}} = \frac{M}{EI} \qquad (1)$$

wherein θ is the angle between the tangent to the elastic curve of the fiber at the given point and the generating line of the cylinder, s is the curvilinear coordinate of the fiber, R is the radius of cylinder 42, M is the bending moment experienced by the fiber, and EI is the flexural rigidity of the fiber. This is the product of the fiber material's Young's modulus E, and the moment of inertia of the cross section I. For a fiber with a cylindrical cross-section, $I=\pi(r_o)^4/4$, where $r_o$ is the radius of the fiber.

In accordance with one embodiment of the invention, the optimized fiber configuration is defined as the arrangement wherein the total curvature K is constant over the entire fiber "pigtail" length, or $$\kappa = \sqrt{\left[\frac{d\theta}{ds}\right]^2 + \frac{\sin^2\theta}{R^2}} = \frac{M}{EI} = \text{const.} \quad (2)$$

The longitudinal distance, dz, can be found as $$dz = ds\cos\theta = \frac{ds}{d\theta}\cos\theta d\theta. \quad (3)$$

Solving equation (2) for the derivative dθ/ds (curvature) and introducing the obtained expression in equation (3), the longitudinal distance dz can be found as $$dz = \frac{EI}{M} \frac{\cos\theta d\theta}{\sqrt{1 - \left[\frac{EI}{MR}\right]^2 \sin^2\theta}} \quad (4)$$

so that $$z = \frac{EI}{M} \int_0^\theta \frac{\cos\theta d\theta}{\sqrt{1 - \left[\frac{EI}{MR}\right]^2 \sin^2\theta}} = R\arcsin\left[\frac{EI}{MR}\sin\theta\right] \quad (5)$$

Applying the boundary conditions z=d, for θ=π/2, the bending moment M can be obtained as follows $$M = \frac{EI}{R} \frac{1}{\sin\left[\frac{d}{R}\right]} \quad (6)$$

The corresponding bending stress is $$\sigma_0 = E\frac{r_0}{R} \frac{1}{\sin\left[\frac{d}{R}\right]} \quad (7)$$

wherein $r_o$ is the radius of fiber 40, and $\sigma_o$ is the stress on a fiber having an optimum configuration in accordance with the present invention. In an example, wherein the radius, R, of cylinder is 28.0 mm and the fiber span d is 24.0 mm, the maximum stress experienced on a fiber bent in its natural configuration is about σ=22.637 kg/mm². In a fiber that is configured in its optimized arrangement as described hereinafter in more detail, the bending stress, as predicted by formula (7) is $$\sigma_0 = 7384 \frac{0.0625}{28.0} \frac{1}{\sin\frac{24}{28}} = 21.802 \text{kg/mm}^2$$

Hence, in this example, the gain due to the fiber configuration optimization is about 4.6%. In another example with the radius of cylinder R=16.1 mm, the maximum bending stress experienced by a fiber in its natural configuration is $\sigma_o$=30.588 kg/mm². In the case of fiber of an optimized configuration, the bending stress as predicted by formula (7) is $\sigma_0$=28.757 kg/mm². This bending stress corresponds to a stress relief of about 6%.

Introducing equation (6) into (5), the longitudinal coordinate z can be expressed as $$z = R\arcsin\left[\sin\left[\frac{d}{R}\right]\sin\theta\right] \quad (8)$$

In accordance with one embodiment of the invention it is advantageous to define a curvilinear coordinate s' as illustrated by arc 46 in FIG. 2. Such coordinate s' is defined as the portion of a circumference between the intersection with the z axis and the elastic curve of fiber 40. The element ds' can be defined as $$ds' = \sin\theta ds = \frac{ds}{d\theta}\sin\theta d\theta = \frac{R\sin\frac{d}{R}\sin\theta d\theta}{\sqrt{1 - \sin^2\left[\frac{d}{R}\right]\sin^2\theta}} \quad (9)$$

so that $$s' = R\sin\left[\frac{d}{R}\right]\int_0^\theta \frac{\sin\theta d\theta}{\sqrt{1 - \sin^2\left[\frac{d}{R}\right]\sin^2\theta}} = d - R\arctan\left[\tan\left[\frac{d}{R}\right]\cos\theta\right] \quad (10)$$

Excluding the angle (parameter) θ from the equations (8) and (10), it is possible to define s' as $$s' = d - R\arctan\left[\tan\left[\frac{d}{R}\right]\sqrt{1 - \frac{\sin^2\left[\frac{z}{R}\right]}{\sin^2\left[\frac{d}{R}\right]}}\right] \quad (11)$$

Figure 3:
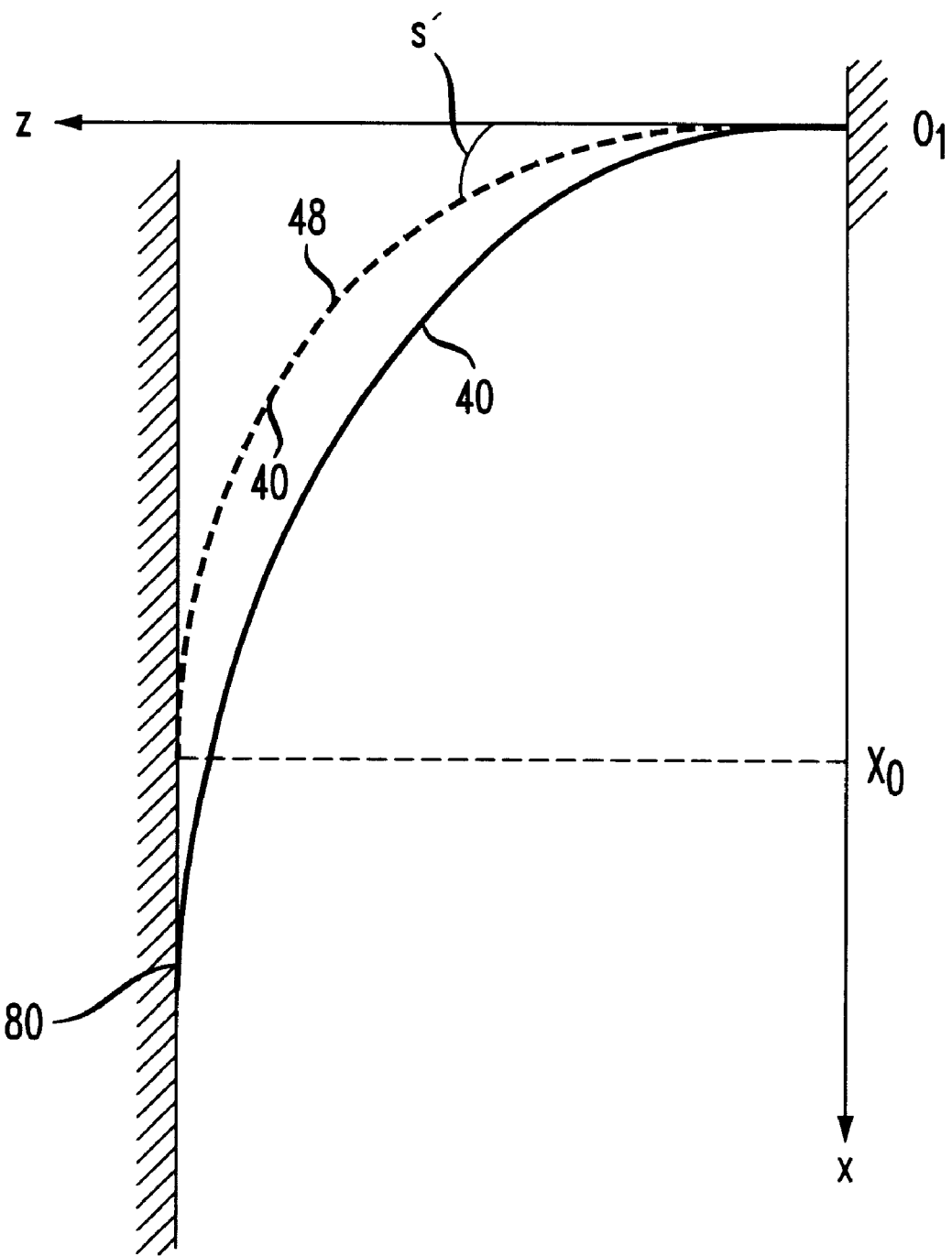
FIG. 3 illustrates an optimized configuration on a cylindrical surface in accordance with another embodiment of the invention.

Equation (11) defines an optimized configuration of fiber bent on a cylindrical surface as illustrated in FIG. 3. FIG. 3 illustrates bent fiber 40 in its natural configuration and in its optimized configuration along the dotted curve 48. The curvilinear coordinate s' changes from zero to d (FIG. 3) when the longitudinal coordinate z changes from zero to d. For large R values (for example, R larger than 5d) the following approximate relationships can be used:

$$\sin\left[\frac{d}{R}\right] \approx \frac{d}{R}, \sin\left[\frac{z}{R}\right] \approx \frac{z}{R}, \tan\left[\frac{d}{R}\right] \approx \frac{d}{R}. \quad (12)$$

Then equation (11) can be simplified as follows:

$$s' = d - \sqrt{d^2 - z^2} = d\left[1 - \sqrt{1 - \frac{z^2}{d^2}}\right]. \quad (13)$$

Figure 4:
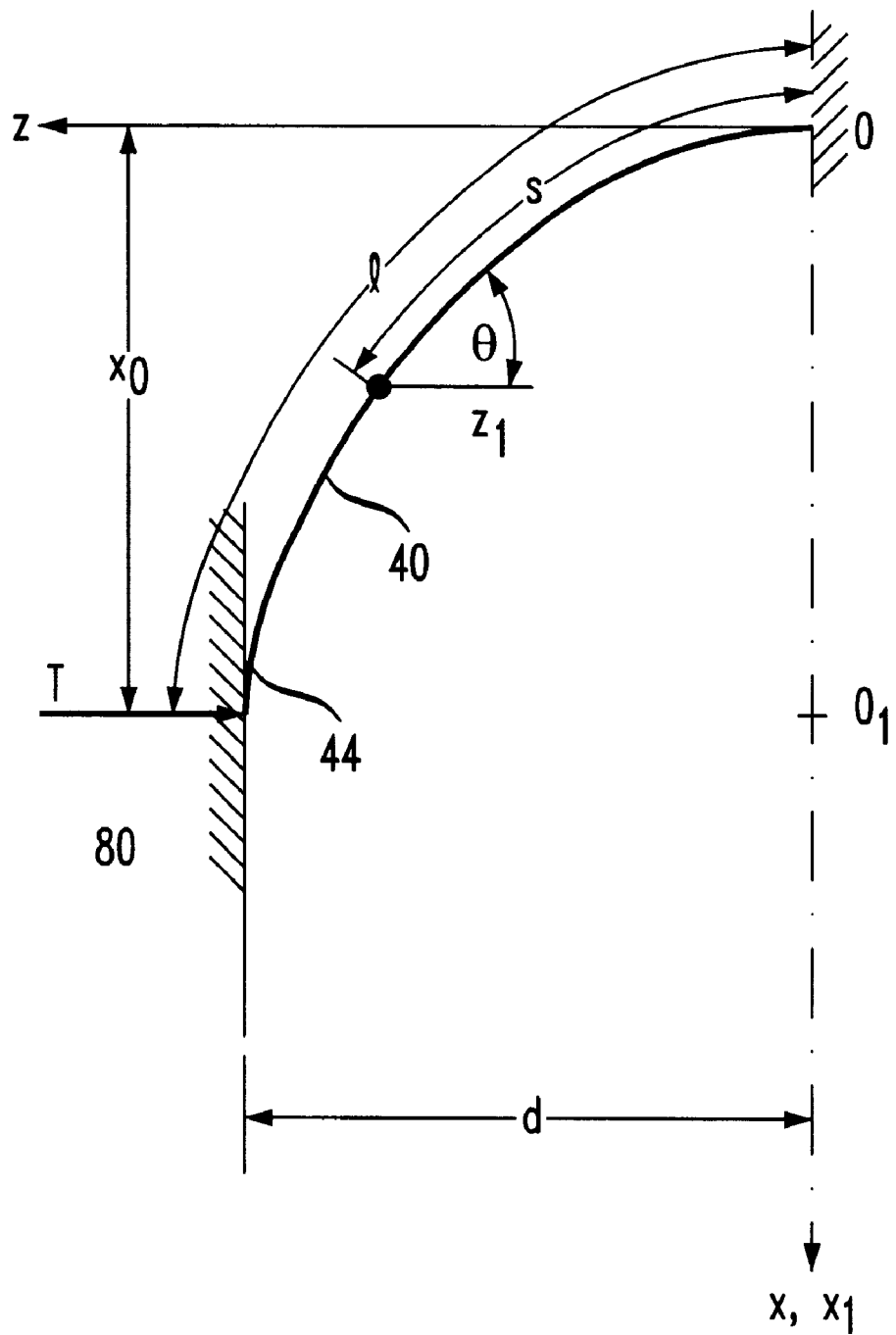
FIG. 4 illustrates a special case of a bent fiber on a two-dimensional plane in accordance with another embodiment of the invention.

The stress relief due to the optimization of the fiber configuration increases with an increase in the radius R of the cylinder, which is largest in the two-dimensional case. Thus, the optimized configuration of fiber, when it is bent on a plane, is illustrated in FIG. 4. One end of the fiber is clamped at the origin (x=0 and z=0) and the other end 44 is disposed against a restraint 80 (such as the inner surface of a flange). The arrangement in FIG. 4 may be viewed as the case of a fiber wrapped around a cylinder of a very large radius, R, R→∞. The optimal configuration of fiber 40 occurs when the fiber experiences a constant bending moment M over its entire length. The equation of equilibrium for fiber 40 in FIG. 4 is $$EI\frac{d\theta}{ds} = M \tag{14}$$

wherein as mentioned above, E is the Young's modulus of the fiber material, I is the moment of inertia of the fiber, $\theta$ is the angle of each point on the fiber with respect to the z axis, s is the curvilinear coordinate along the length of the fiber, and M is the bending moment. Since $$\frac{dz}{ds} = \cos\theta$$

equation (14) yields:

$$\frac{dz}{ds} = \frac{dz}{d\theta}\frac{d\theta}{ds} = \frac{M}{EI}\frac{dz}{d\theta} = \cos\theta, \tag{15}$$

so that $$z = \frac{EI}{M}\int_0^\theta \cos\theta d\theta = \frac{EI}{M}\sin\theta.$$

Applying the boundary condition $z(\pi/2) = d$ to equation (15) results in $$M = \frac{EI}{d}. \tag{16}$$

From equations (16) and (14) we find:

$$\frac{d\theta}{ds} = \frac{1}{d}. \tag{17}$$

Since $dx/ds = \sin\theta$, equation (17) may be employed as $$\frac{dx}{ds} = \frac{1}{d}\frac{dx}{d\theta} = \sin\theta \tag{18}$$

so that $$x = d\int_0^\theta \sin\theta d\theta = d(1 - \cos\theta)$$

and therefore, $$x_0 = x\left(\frac{\pi}{2}\right) = d \tag{19}$$

wherein $x_0$ corresponds to the position of restraint 80 along the x coordinate of an optimally configured fiber in FIG. 4. Excluding the angle $\theta$ from the equations 15 and 18, the equation of the elastic curve of the fiber can be represented as $$\frac{x^2}{d^2} - \frac{2x}{d} + \frac{z^2}{d^2} = 0. \tag{20}$$

With $x = d - x_1$ and $z = z_1$, equation (20) may be rewritten as $$x_1^2 + z_1^2 = d^2.$$

This is the equation of a circle having a radius d, and a center located at point $O_1$ (FIG. 4). The length of the fiber bend is $$l = \frac{\pi}{2}d = 1.5708d. \tag{21}$$

The induced bending stress can be found as $$\sigma_0 = E\frac{r_0}{d} \tag{22}$$

wherein $r_0$ is the radius of the fiber and E is its Young's modulus. It is thus noted that the optimized configuration of a bent fiber on a two dimensional plane is a quarter of a circumference with a radius d. Compared to a bent fiber in its natural configuration, (such a configuration illustrated in FIG. 3) the optimized configuration results in a reduced bending stress by a factor of about 1.1982, which is a 20% stress relief.

Thus, in accordance with the present invention, it is possible to reduce the bending stress experienced by a bent fiber, by "forcefully" changing its configuration from the natural one, when the fiber curvature (bending stress) is essentially non-uniformly distributed over the fiber length, to the configuration, characterized by a constant curvature throughout the fiber length. The effect of the optimization is the largest—on the order of 20%—for cylindrical surfaces of large radii. The arrangement suggested by the present invention may be employed in the design of optical fiber "pigtails" such as those employed in photonic structures, as illustrated in FIG. 1.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention. Specifically, the invention suggests that appreciable relief in the optical fiber "pigtail", interconnect, etc, can be achieved by a "forced" optimization of the fiber configuration. Such an optimization can be implemented in accordance with the techniques of this invention.

I claim:

1. A method for reducing the stress in a fiber by varying the curvature of a fiber disposed on a cylindrical surface, such that first end of the fiber is clamped to said cylindrical surface and the second end of the fiber is moveably fastened to said cylindrical surface, said method comprising the steps of:

extending said fiber around a portion of said cylinder;

providing a fastening element so as to control the location of said second end of the fiber on said cylindrical surface; and adjusting the curvature of said fiber such that the total curvature $\kappa$ of said fiber remains substantially constant over the entire length of said fiber.

2. The method in accordance with claim 1, wherein said step of adjusting further comprises the step of locating said fastening element such that $$s' = d - R\arctan\left[\tan\left[\frac{d}{R}\right]\sqrt{1 - \frac{\sin^2\left[\frac{z}{R}\right]}{\sin^2\left[\frac{d}{R}\right]}}\right]$$

wherein z is the longitudinal coordinate parallel with the longitudinal axis of said cylindrical surface such that at the point wherein said first end is clamped z=0, s' is the curvilinear coordinate of the fiber measured as a portion of a circumference that intersects said z coordinate and said fiber, d is the distance measured along the z coordinate between said first end to said second end of said fiber, and R is the radius of said cylinder surface.

3. The method in accordance with claim 1, wherein said step of adjusting further comprises the step of locating said fastening element such that $$s' = d - \sqrt{d^2 - z^2} = d\left[1 - \sqrt{1 - \frac{z^2}{d^2}}\right]$$

wherein z is the longitudinal coordinate parallel with the longitudinal axis of said cylindrical surface such that at the point wherein said first end is clamped z=0, s' is the curvilinear coordinate of the fiber measured as a portion of a circumference that intersects said z coordinate and said fiber, d, is the distance measured along the z coordinate between said first end to said second end of said fiber.

4. The method in accordance with claim 2, wherein said fiber optic is disposed in a pig-tail arrangement in a photonic device.

5. A method reducing the stress in the fiber by varying the curvature of an optical fiber disposed on a plane surface, such that first end of the fiber is clamped to a first location on said plane and its second end is moveably fastened to a second location on said plane, said method comprising the steps of:
   extending said fiber around a portion of said plane surface;
   providing a fastening element so as to control the location of said second end of the fiber on said plane; and
   adjusting the curvature of said fiber such that the total curvature κ of said fiber remains substantially constant over the entire length of said fiber.

6. The method in accordance with claim 5 wherein said step of adjusting comprises the step of locating said fastening element such that said fiber forms a quarter of a circumference.

7. The method in accordance with claim 6 wherein the radius of said circumference is substantially equal to the span of said fiber, wherein span is the distance between said first end of the fiber and said second end of the fiber along a horizontal axis of said plane surface.

8. A gain equalization filter splice box comprising:
   a cylindrical structure having a cylindrical surface;
   a glass fiber wrapped around said cylindrical surface, such that the first end of said glass fiber is fixedly attached to a first location of said cylindrical surface;
   a fastening element configured to hold the second end of said glass fiber such that the total curvature of said fiber substantially remains constant over the length of said fiber.

9. The device in accordance with claim 8, wherein the curvature of said fiber is defined as $$s' = d - \sqrt{d^2 - z^2} = d\left[1 - \sqrt{1 - \frac{z^2}{d^2}}\right]$$

wherein z is the longitudinal coordinate parallel with the longitudinal axis of said cylindrical surface such that at the point wherein said first end is clamped z=0, s' is the curvilinear coordinate of the fiber measured as a portion of a circumference that intersects said z coordinate and said fiber, d is the distance measured along the z coordinate between said first end to said second end of said fiber, and R is the radius of said cylinder surface.

10. The device in accordance with claim 9, wherein said fiber is disposed in a pig-tail arrangement in said gain equalization filter splice box.

* * * * *